(12) United States Patent
D'Ayot (10) Patent No.: US 7,538,504 B2
(45) Date of Patent: May 26, 2009

(54) METHOD OF OPERATION OF A HOME-AUTOMATION INSTALLATION

(75) Inventor: Geoffroy Dumont D'Ayot, Seynod (FR)

(73) Assignee: Somfy SAS, Cluses (FR)

( * ) Notice: Subject to any disclaimer, the term of this patent is extended or adjusted under 35 U.S.C. 154(b) by 511 days.

(21) Appl. No.: 11/302,655

(22) Filed: Dec. 14, 2005

(65) Prior Publication Data

US 2006/0132072 A1 Jun. 22, 2006

(30) Foreign Application Priority Data

Dec. 21, 2004 (FR) .................................. 04 13655

(51) Int. Cl.
*H02P 1/00* (2006.01)
(52) U.S. Cl. ................. 318/280; 318/445; 318/465
(58) Field of Classification Search ................. 361/31; 318/280, 445, 466, 468, 469
See application file for complete search history.

(56) References Cited

U.S. PATENT DOCUMENTS 5,325,033 A * 6/1994 Obermair .................. 318/757

2003/0030950 A1 2/2003 Bruno

FOREIGN PATENT DOCUMENTS

| EP | 0 718 729 | A | 6/1996 |
|---|---|---|---|
| EP | 0 822 315 | A | 2/1998 |
| EP | 1 154 121 | A | 11/2001 |
| FR | 2 806 850 | | 9/2001 |
| FR | 2 811 703 | | 1/2002 |
| FR | 2 844 625 | | 3/2004 |
| JP | 11-81823 | | 3/1999 |
| JP | 2002-199786 | | 7/2002 |

* cited by examiner

*Primary Examiner*—Karen Masih
(74) *Attorney, Agent, or Firm*—Frommer Lawrence & Haug LLP; Ronald R. Santucci (57) ABSTRACT

The method of operation is applied to an installation comprising an actuator supplied with an AC electric voltage and intended to drive a movable element equipping a building, in a first direction when the AC electric voltage is applied between a neutral conductor and a first phase conductor and in a second direction when the AC electric voltage is applied between the neutral conductor and a second phase conductor. It is a method wherein an item of information detected at the level of the actuator causes a sequence of at least one switching making or breaking a direct contact between the first and the second phase conductor.

16 Claims, 5 Drawing Sheets

METHOD OF OPERATION OF A HOME-AUTOMATION INSTALLATION

This application claims priority benefits from French Patent Application No. 04 13655 filed Dec. 21, 2004.

BACKGROUND OF THE INVENTION

The invention relates to a method of operation of an installation comprising at least one actuator supplied with an AC electric voltage and intended to drive a movable element equipping a building, in a first direction when the AC electric voltage is applied between a neutral conductor and a first phase conductor and in a second direction when the AC electric voltage is applied between the neutral conductor and a second phase conductor. It also relates to an actuator, to a control unit and to an installation for the implementation of the method.

Actuators in the building industry and that are intended for maneuvering movable elements often comprise a monophase induction motor (or asynchronous motor) with permanent capacitor. They are supplied via the AC network, for example 230 V 50 Hz through a control box comprising a user interface. The cabling between the control box and the actuator comprises three wires: a neutral conductor and two phase conductors. Depending on the phase conductor linked to the phase of the AC network, the motor turns in a first direction or in a second direction.

DESCRIPTION OF THE PRIOR ART

Patent application FR 2 844 625 discloses an installation comprising a command transmitter, a command receiver and an actuator, the actuator being supplied via the AC network through the control transmitter and the control receiver. The cabling between the control transmitter and the actuator comprises just two conductors: a phase conductor and a neutral conductor. The control commands sent between the command transmitter and the command receiver consist of interruptions to certain half-waves of the voltage of the network.

Also disclosed, by patent application EP 0 822 315, is a device for the wire-based control of the supply to an asynchronous electric motor in which, a short-circuiting of the phase lines allowing the rotation of the motor in a first direction and in a second direction by simultaneously pressing control keys for rotating the motor in the first direction and in the second direction, places a control unit in a configuration mode. Once in this configuration mode, the rotation of the motor is controlled by pressings of the keys serving to control the rotation of the motor in the control mode. Likewise in patent application EP 1 154 121, a control unit toggles into programming mode when a shunt is put in place for connecting two phase lines to the phase conductor.

In such installations, the user may not be informed of the appropriate execution of a command, otherwise than by the transmission of a sensory signal for example a visual or audible signal perceptible in the vicinity of the actuator, these installations having no means of returning information from the actuator to the control unit.

Patent application EP 0 718 729 discloses an installation comprising home-automation devices controlled by way of a control box to which they are linked by a wire link. The visual and/or audible signals may in particular consist of a slight to-and-fro movement of a roller blind driven by an actuator. The problem arises in particular during the execution of a general control command. This command is given from a particular control point, from where not all the devices are visible. The reaction of one of the devices informs as to the state of the other devices. However, it is particularly beneficial to be able to inform the user of the appropriate execution of the commands, even when no device is visible.

Patent application FR 2 811 703 discloses a motorized roller blind control device comprising a control box furnished with an up and down control inverter for raising and lowering the panel of the roller blind. This box is connected to the AC network and is linked by wire to the drive motor of the roller blind. The box comprises means for measuring the motor load, these means being used to detect the ends of travel and to instruct stoppages of the roller blind at these ends of travel. The box is therefore partially informed of the state of the actuator. However, such a device would not make it possible to control several actuators.

SUMMARY OF THE INVENTION

The aim of the invention is to provide a method of operation aimed at alleviating the problems cited and at affording improvements with respect to the known methods of the prior art. In particular, the method according to the invention makes it possible to inform the user of various states which the actuator is in without requiring remote communication means of radioelectric wave or infrared wave type. The aim of the invention is also to provide an actuator and a control box allowing the implementation of such a method.

The method of operation according to the invention is one wherein an item of information detected at the level of the actuator causes a sequence of at least one switching making or breaking a direct contact between the first and the second phase conductor.

By direct contact is intended any means making it possible to bring the two phase conductors substantially to the same potential. Thus, a contact between the two conductors, effected, for example with the aid of a thyristor in the on state, is regarded as a direct contact even though these two potentials are not rigorously identical on account of the existence of the conduction voltage of the thyristor (substantially equal to 1 volt).

Various modes of execution of the method according to the invention are within the scope of the claims.

The actuator according to the invention is supplied with an AC electric voltage, is intended to drive a movable element equipping a building in a first direction when the AC electric voltage is applied between a neutral conductor and a first phase conductor and in a second direction when the AC electric voltage is applied between the neutral conductor and a second phase conductor and comprises a monophase induction motor with permanent capacitor, the capacitor being linked to each non-common end of two windings of the motor, these windings moreover comprising a common end, and at least one first and one second controlled switch. It is one wherein the first controlled switch makes it possible to link the first phase conductor to the common end of the windings and wherein the second controlled switch makes it possible to link the second phase conductor to the common end of the windings.

Various modes of embodiment of the actuator according to the invention are within the scope of the claims.

The control unit according to the invention comprises a first terminal intended to be linked to a first phase conductor of an actuator, a second terminal intended to be linked to a second phase conductor of the actuator, a third terminal intended to be linked to the phase of an AC supply voltage, two switches disposed respectively on a conductor linking the first terminal to the third terminal and on a conductor linking the second terminal to the third terminal. It is a unit which comprises a means of detecting the existence of a direct contact between the first terminal and the second terminal.

The installation comprises at least one actuator defined above and at least one control unit defined above.

DESCRIPTION OF THE DRAWINGS

The appended drawing represents, by way of example, a mode of execution of the method of operation according to the invention and an embodiment of an installation according to the invention.

DESCRIPTION OF THE PREFERRED EMBODIMENTS

Figure 1:
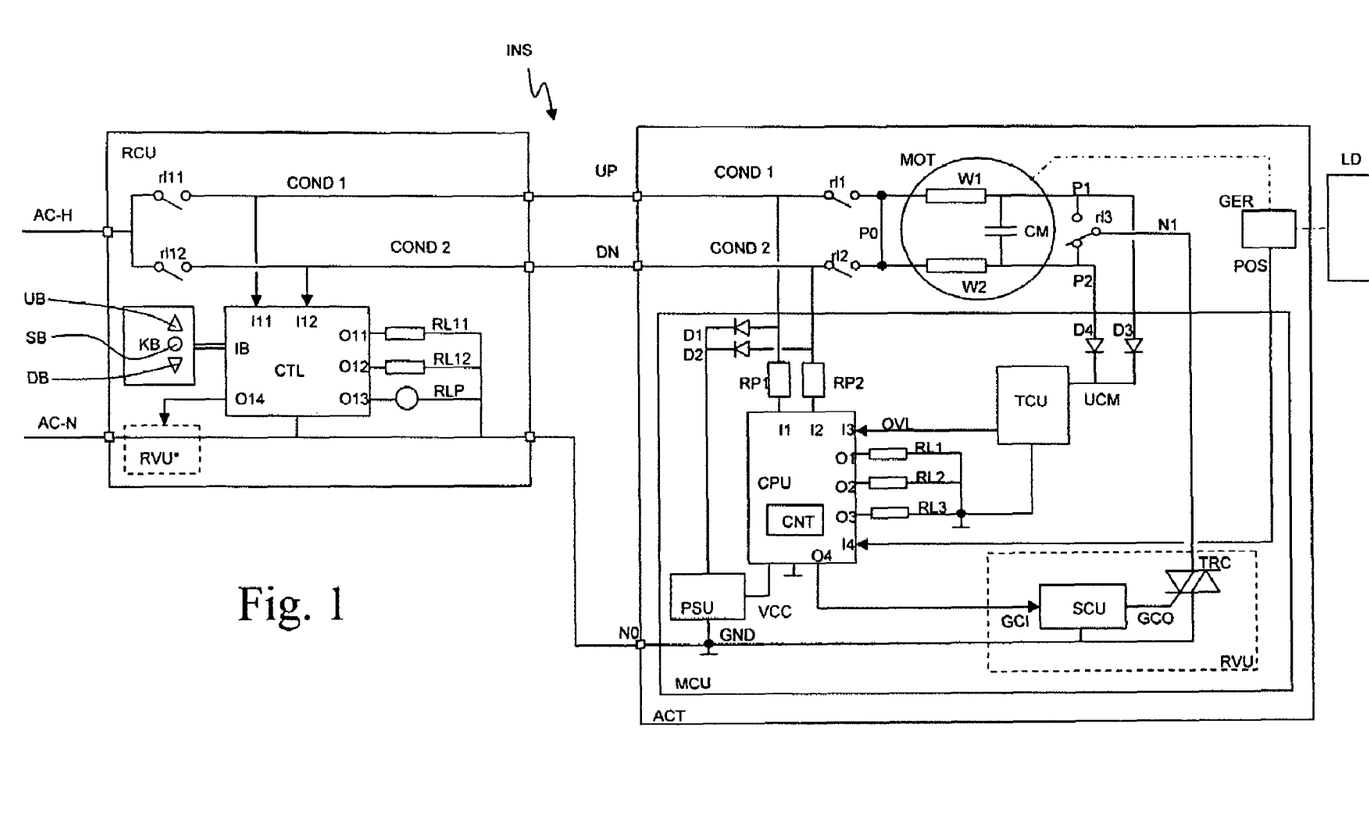
FIG. 1 is a diagram of an embodiment of an installation according to the invention.

The installation INS represented in FIG. 1 mainly comprises an actuator ACT and a control unit RCU. The actuator ACT allows the driving of a movable element LD such as a roller blind or an awning. The installation is supplied by the AC network, via a neutral conductor AC-N and a phase conductor AC-H. The control unit RCU makes it possible to apply the potential of the phase conductor AC-H either to an up phase input UP or to a down phase input DN of the actuator. The neutral conductor AC-N is connected to a neutral terminal N0 of the actuator ACT.

The movable element LD is driven by a motor MOT of induction type by way of a reducer GER. It should be noted that the link between this output shaft and the movable element LD is not necessarily rigid. The motor MOT comprises a first winding W1, a second winding W2 and a permanent capacitor CM. The common point shared by the two windings P0 is linked to a first relay contact rl1 and to a second relay contact rl2. When the first relay contact is activated, the common point P0 shared by the two windings is linked to the up phase input UP, and when the second relay contact is activated, the common point P0 shared by the two windings is linked to the down phase input DN.

The other two ends P1 and P2 of each winding are linked to the terminals of a permanent capacitor CM, allowing an appropriate phase shift of the currents traversing each winding. An inverter relay contact rl3 allows a connection of an internal wire N1 either to the end P1 of the first winding, or to the end P2 of the second winding. The internal wire N1 is linked to the neutral terminal N0, via a triac TRC. In other simplified embodiments, the link between the points N1 and N0 may be direct. The triac TRC may also be replaced with any other type of controlled switch.

An electronic control circuit MCU comprises diverse means ensuring the control of the actuator, that is to say means of reception and of interpretation of the commands received, means of control of the supply to the actuator, and of interruption of this supply either by command or when an end of travel is detected.

For this purpose, the electronic control circuit MCU comprises a very low voltage, for example 5V, supply device PSU. The supply device comprises for example a transformer whose secondary winding makes it possible to deliver the DC supply voltage VCC, after passing through a rectifier and a filtering element (neither represented). Any simple type of step-down AC/DC converter is suitable for embodying the supply device PSU.

The electronic control circuit MCU comprises a logic processing unit CPU such as a microcontroller. This logic processing unit is supplied with the supply voltage VCC and comprises a first input I1 linked to the up phase input UP by a first voltage step-down arrangement RP1 and a second input I2 linked to the down phase input DN by a second voltage step-down arrangement RP2. These voltage step-down arrangements are symbolized by a resistor but may comprises a divider bridge and diverse elements for protection and/or for rectification.

When the control unit RCU makes the contact between the phase conductor AC-H and the up phase input terminal UP, the first input I1 goes to the high logic state, thereby making it possible to detect an up command. Conversely, the second input I2 goes to the high logic state when the control unit RCU makes the contact between the phase conductor AC-H and the input terminal of the down phase DN, thereby making it possible to detect a down command.

The logic processing unit CPU comprises a first output O1 supplying a first relay coil RL1 and a second output O2 supplying a second relay coil RL2, these coils acting respectively on the first relay contact rl1 and on the second relay contact rl2.

The logic processing unit comprise a third output O3 supplying a third relay coil RL3. This relay coil acts on the position of the inverter relay contact rl3. Depending on whether the relay coil RL3 is or is not supplied, the motor MOT turns in one or other direction. This layout of the relay contacts allows the logic processing unit CPU to cause the stoppage of the motor even in the presence of a movement command given by the control unit RCU. It also makes it possible to invert if necessary the relation between each position of the inverter switch and each motor phase. Other layouts known from the prior art make it possible to achieve this function.

The logic processing unit also comprises a third input I3 connected to the output OVL of a device TCU for detecting overload of forces. This input I3 may be of logic type and the device TCU for detecting overload of forces may cause its overload output OVL to go to the high logic state at least if the variation in torque measured exceeds a predetermined value in a given time interval.

More precisely, the device TCU for detecting overload of forces measures a voltage signal UCM across the terminals of the permanent capacitor CM which corresponds to the value of the motor torque. When the rotor of the motor slows down, on account of the bigger resisting torque, this voltage decreases. It is therefore at least the decay of this voltage in a given time interval which causes the overload output OVL to go to the high state. In addition to this function, the device TCU for detecting overload of forces may moreover cause the overload output OVL to go to the high state if the amplitude of the voltage across the terminals of the capacitor goes below a given threshold. An embodiment of such a device for detecting overload of forces is described in patent FR 2 806 850, with reference to FIG. 1, from line 31 page 4 to line 14 page 6.

The voltage signal UCM is equal (to within 0.6 V) to the voltage across the terminals of the permanent capacitor CM, half-wave rectified since one of the two diodes D3 or D4 turns off according to the position of the inverter relay contact rl3.

Alternatively, the device TCU for detecting overload of forces may deliver an analog voltage on the overload output OVL and the third input I3 of the logic processing unit CPU may be of analog type. The processing of the study of the variations of this analog quantity is then carried out in the logic processing CPU.

The logic processing unit comprises a fourth input I4, connected to the output of a position sensor P0S. This position sensor allows the measurement of the position of the movable element LD. Preferably, the position sensor is disposed at the level of the output of the reducer GER. This sensor commonly comprises two Hall-effect probes making it possible to determine the direction and the amplitude of the movement. The pulses received on the fourth input I4 from the output of the position sensor P0S make it possible to update a memory, typically a counter CNT, whose content is the image of the position of the movable element LD.

The logic processing unit finally comprises a fourth output O4 connected to the command input GCI of a triac command circuit SCU, whose command output GCO is connected to the gate of the triac TRC.

The triac can be used to reduce the power of the motor when the movable element LD arrives in the vicinity of end stops. It may also advantageously serve to cut off the supply to the motor upon receipt of a stop command. In this case, the three contacts of the relays, rl1-rl3, do not need to exhibit a sizable interruption capability, this allowing the use of economical relays. The benefit of the presence of the triac is also that it makes it possible to act on the first and the second relay contact rl1, rl2 without however causing the rotation of the motor. Nevertheless the triac may be replaced with a short-circuit between the points N1 and N0 in the case of a simplified arrangement.

In FIG. 1, the remote control unit RCU is linked to the neutral conductor AC-N, but this is not essential. This unit comprises a keyboard KB, linked to a bus input IB of a logic processing unit CTL, such as a microcontroller. The keyboard represented comprises a control key UB for instructing upward movement, a control key DB for instructing downward movement and a control key SB for instructing stoppage of movement.

The supply circuit for the logic processing unit CTL is not represented. Arrangements known from the state of the art allow the supplying of electronic circuits in a control box, even in the absence of a neutral conductor.

The logic processing unit CTL comprises a first output O11 linked to a first relay coil RL11 and a second output O12 linked to a second relay coil RL12. These coils act respectively on a first contact rl11 and on a second contact rl12. These contacts have a common point linked to the phase conductor AC-H, the other point being linked respectively to the up phase input UP or to the down phase input DN of the actuator ACT. The switches rl1 and ril1 are linked by a conductor referenced COND1 and the switches rl2 and rl12 by a conductor referenced COND2.

The state, supplied or not supplied, of these inputs may be determined by the logic processing unit CTL with the aid of a first input I11 and of a second input I12.

The arrows oriented toward the inputs I11 and I12 symbolize the various voltage drop and protection elements (resistors, diodes, peak limiters) allowing the transformation of the electrical signal in such a way as to render it compatible with the input of a microcontroller. When the mains voltage is applied to the conductor linked to the up phase input UP, then the first input I11 of the logic processing unit CTL goes to the high logic state. Likewise, when the mains voltage is applied to the conductor linked to the down phase input DN, then the second input I12 of the logic processing unit CTL goes to the high logic state.

A third output O13 of the logic processing unit CTL makes it possible to supply a signaling indicator light RLP.

Although the installation described comprises a control unit and an actuator, it is clear that the installation according to the invention may also comprise several control units and/or several actuators, one and the same control unit being able to control various actuators and/or various control units being able to control one and the same actuator. In this case, all the control units and all the actuators are linked to a bus with three wires comprising a neutral conductor and the two conductors COND1 and COND2 and at least one of the control units is linked to the phase AC-H and to the neutral of the supply voltage.

Figure 7:
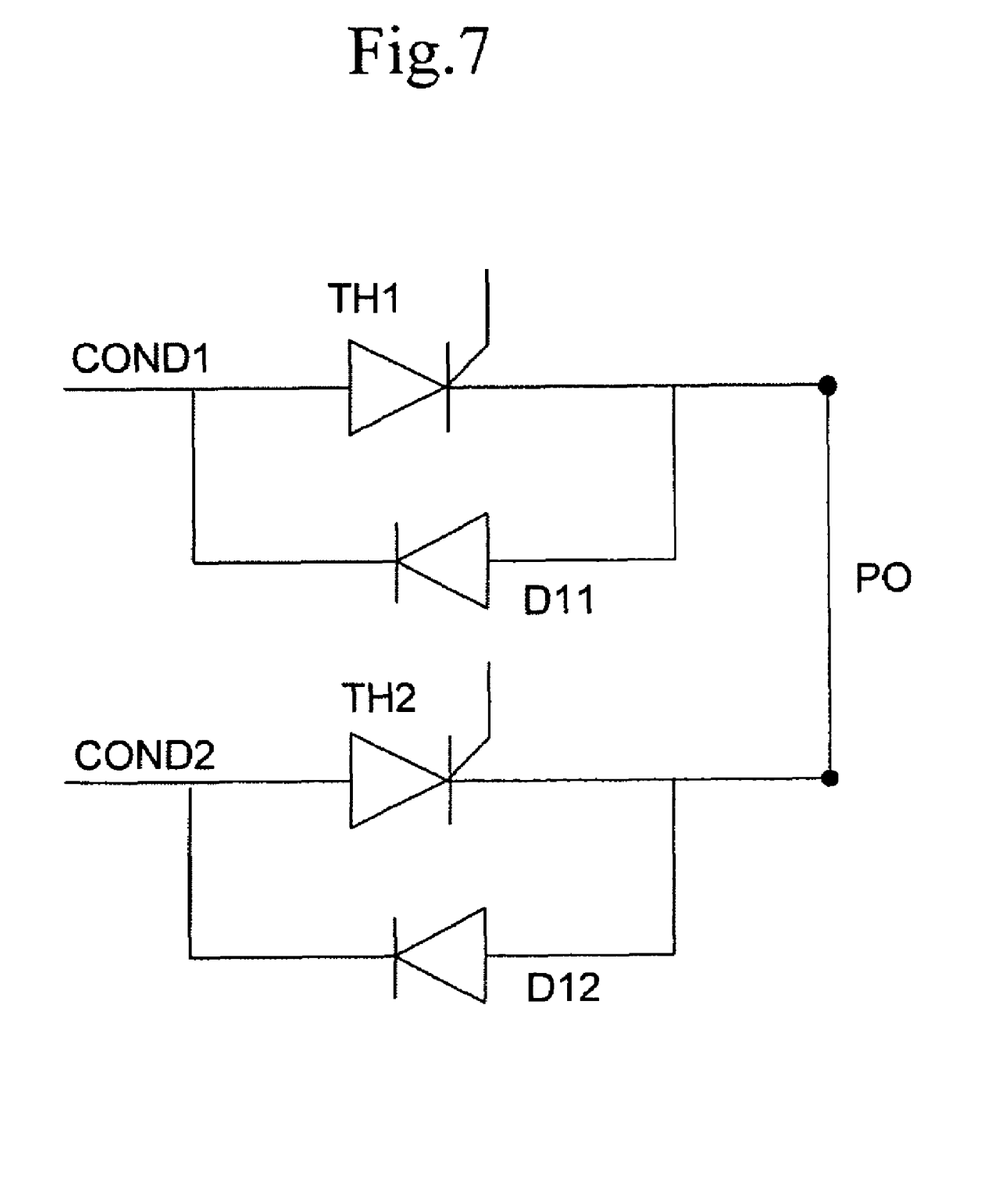
FIG. 7 is a diagram of a variant embodiment of the first and second controlled switches of the actuator.

In one embodiment of the actuator, the switches rl1 and rl2 are replaced with the thyristor and diode arrangements represented in FIG. 7. These arrangements each comprise a thyristor TH1 and TH2 and an anti-parallel diode D11 and D12. The cathodes of the thyristors are connected to the point P0. The gate of the thyristor TH1 is linked to the output O1 of the logic processing unit CPU and the gate TH2 of the thyristor TH2 is linked to the output O2 of the logic processing unit CPU. In such an embodiment of the actuator, a triac TRC or a relay must be disposed between the points N1 and N0, except if the single-wave supply is insufficient to drive the motor.

Figure 2:
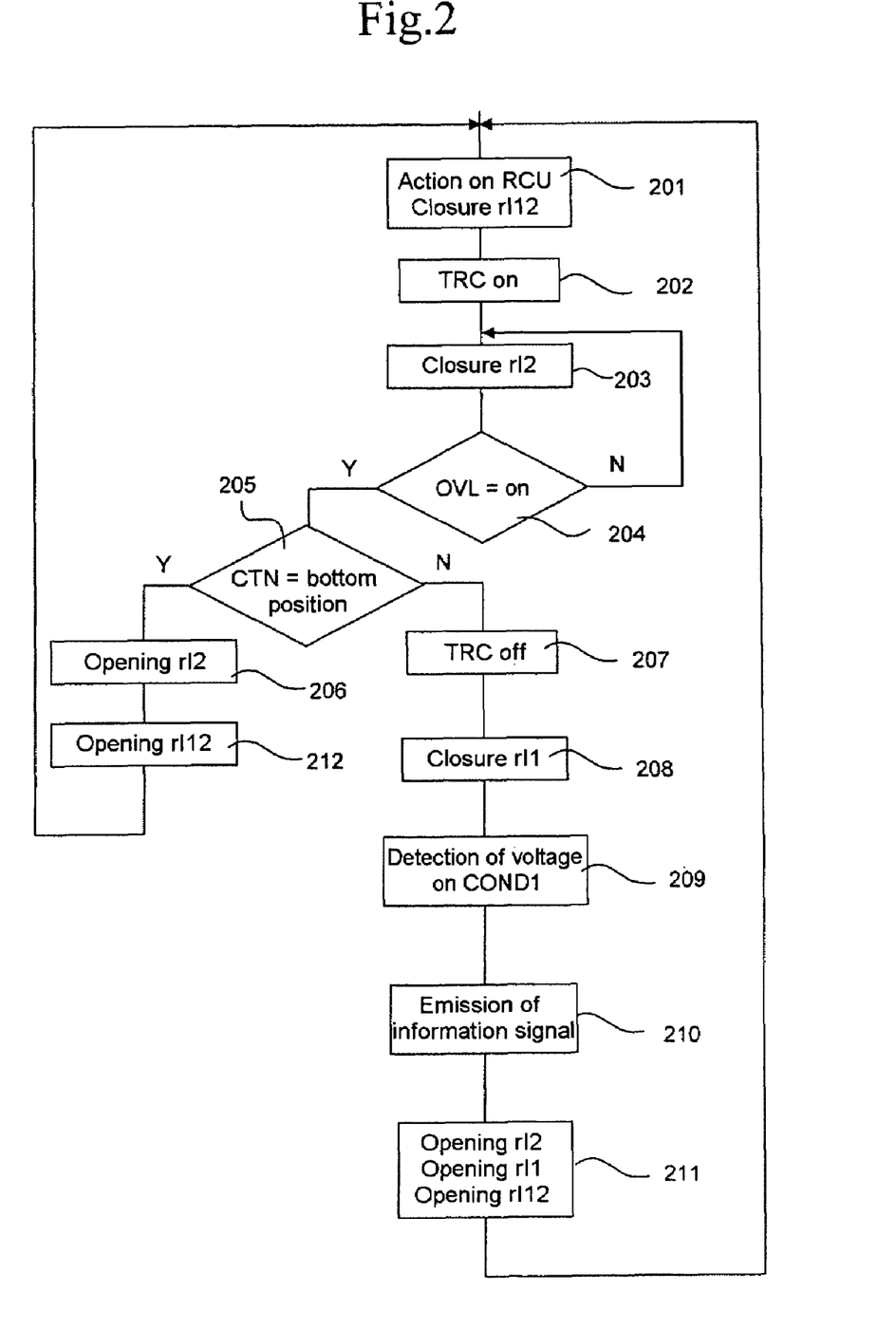
FIG. 2 is a flowchart of an embodiment of the method of operation of the installation according to the invention.

A first procedure relating to the operation of the installation is described with reference to FIG. 2.

A first exemplary procedure makes it possible to confirm the appropriate execution of a command such as a command to drive the movable element to the bottom position. In a first step 201, an action of the user on the control unit brings about the closure of the controlled switch rl12. This has the consequence of linking the conductor COND2 to the phase of the supply voltage.

In a second step 202, the presence of a voltage on the conductor COND2 is detected by the actuator ACT at the level of its logic processing unit CPU: this is interpreted by the logic processing unit CPU as a command to supply the motor MOT.

In a third step 203, the controlled switch rl2 is closed and the motor MOT is supplied in such a way as to turn in a first direction.

In steps 204 and 205, the values of various parameters are investigated: for example the state of the output OVL of the device for detecting overload of force and the state of the counter CNT.

Combining the states of these parameters makes it possible to determine the state of the actuator. If the state of the output OVL indicates that no overload has been detected, the procedure loops back to step 203. If the state of the output OVL indicates that an overload has been detected, we go to step 205 for testing the value of the counter CNT. If an overload is detected although the state of the counter does not correspond to the bottom end-of-travel position, the movable element has encountered an obstacle.

In this case, in a step 207, the triac TRC is turned off in order to interrupt the supply to the motor. This turning off may possibly occur after a brief switching of the controlled switch rl3 aimed at driving the movable element in the up direction for a brief moment.

In a step 208, the switch rl1 is closed. The conductor COND1 is thus brought to the same potential as the conductor COND2.

The appearance of this potential on the conductor COND1 is detected in a step 209 by the logic processing unit of the control unit RCU. This appearance of the potential signifies that a direct contact has been made between the conductors COND1 and COND2.

In a step 210, as a consequence of the detection of step 209, the control unit RCU signals to the user that the travel of the movable element has been interrupted by an obstacle and that the command to take the movable element to the bottom position has not been completely executed. This information signal may for example consist of the activation of an indicator light on the control unit RCU.

In a step 211, the switches rI2, rI1, and rI12, which had previously been closed, are opened. The procedure then loops back to step 201.

If, during step 205, an overload is detected and if the state of the counter corresponds to the bottom end-of-travel position, the movable element has reached the bottom end of travel and, consequently, the command has been correctly executed.

In a step 206, the switch rI2, which had previously been closed, is opened.

In a step 212, on completion of a timeout triggered in the control unit by the action of step 201 on the latter, the switch rI12 is opened.

The procedure then loops back to step 201. No signal is emitted by the control unit.

Alternatively, a signal could be emitted by the control unit both if the movable element has encountered an obstacle or if the movable element has reached a bottom end-of travel.

To this end, the switch may for example be closed and opened twice in a given time interval in step 208. This sequence of opening and closing detected by the control unit RCU would mean that the movable element has been interrupted in its travel and that the command is not executed. The switch may also be closed and opened just once during one and the same given time interval in a step prior to step 206. This sequence of opening and closing detected by the control unit RCU would mean that the movable element has reached the end of travel and that the command is executed. One of these items of information could be signaled by the activation of a first indicator light and other by the activation of a second indicator light on the control unit.

This first procedure may be embodied according different ways. It may, for example, turn out to be more beneficial for the actuator to close the two contacts rI1 and rI2 as soon as the command to maneuver is received. These contacts remain closed during the execution of the command and while the latter has not been completely executed. Once the command has been completely executed one of the switches is opened to signal the reaching of the end of travel by the movable element. This variant execution is described with reference to FIGS. 3 and 4 relating to procedures for operating the actuator and the control unit.

Figure 3:
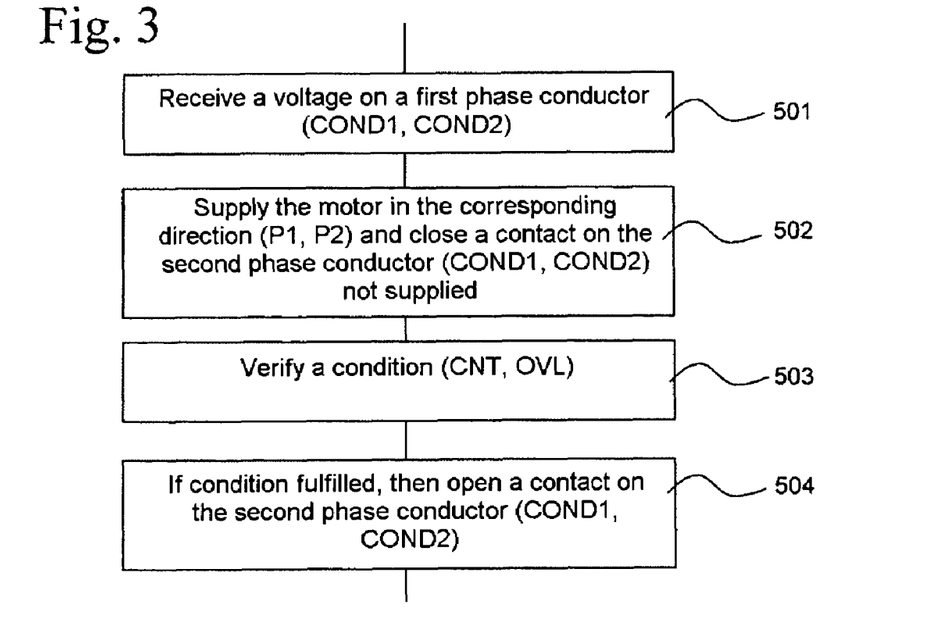
FIGS. 3 to 6 are flowcharts of operating procedures of the installation.
Figure 4:
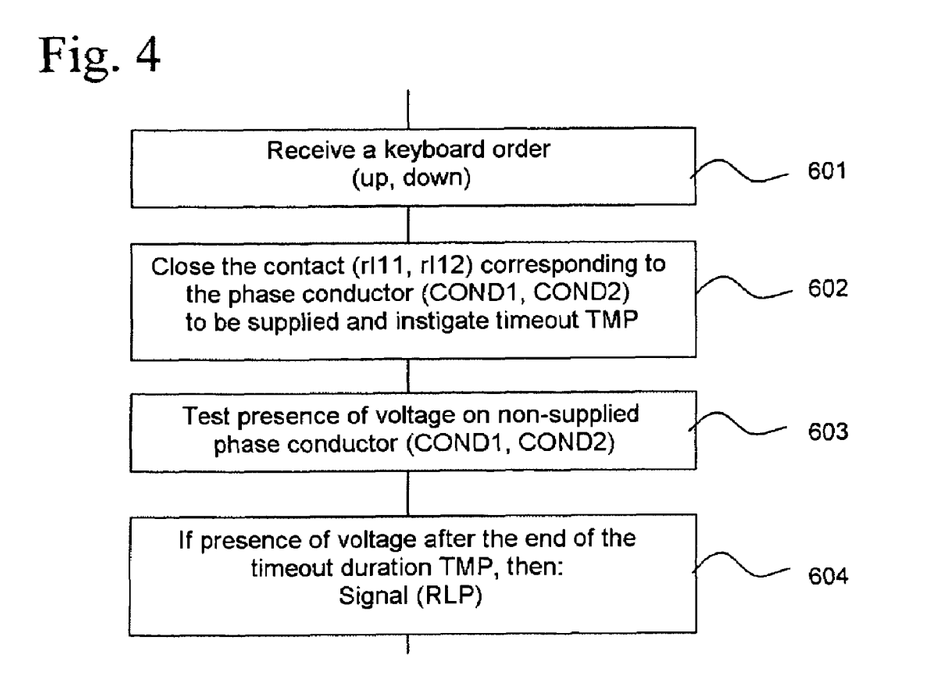

This variant execution is particularly beneficial if several actuators are linked to one and the same control unit. In this case, the previous down command is applied to several actuators. To do this, in a step 601, on receipt of an activation of the key DB of the keyboard KB of the control unit RCU, the supply contact rI12 is closed, in a step 602 so as to connect the phase wire AC-H to the input DN of the actuators. Furthermore, in this step 602 a timeout TMP whose duration corresponds to the maximum maneuvering time of the actuators, for example 15 seconds, is instigated. Upon receipt of the down command in a step 501, each actuator supplies, in a step 502, the motor in the direction corresponding to down, but also closes the contact rI1 on the conductor COND1, not supplied from the control unit. Each actuator tests, in a step 503, the appropriate execution of the command. For example, it tests the value contained in the counter CNT and checks whether this value is equal to the value of the counter corresponding to the bottom position of the movable element. The actuator then opens, in a step 504, the contact rI1 linked to the conductor COND1 as soon as the condition is satisfied. The potential of the conductor COND1 is tested, in a step 603, during the timeout. This potential should normally be in the high state during the movement of the actuators, but should fall back to the low state as soon as all the movable elements have reached their bottom end-of-travel position. Stated otherwise, the conductor COND1 common to the actuators is no longer supplied once all the movable elements have arrived normally at the bottom position. If, in a step 604, the potential of the conductor COND1 has not fallen back on completion of the timeout, this signifies that at least one of the movable elements has not reached its bottom end-of-travel position. The control unit then emits an information signal accordingly.

A second procedure relating to a command to displace the movable element to a predefined intermediate position is described hereinbelow.

It is assumed that a particular value of intermediate position ip has been previously recorded in a memory of the actuator.

Figure 5:
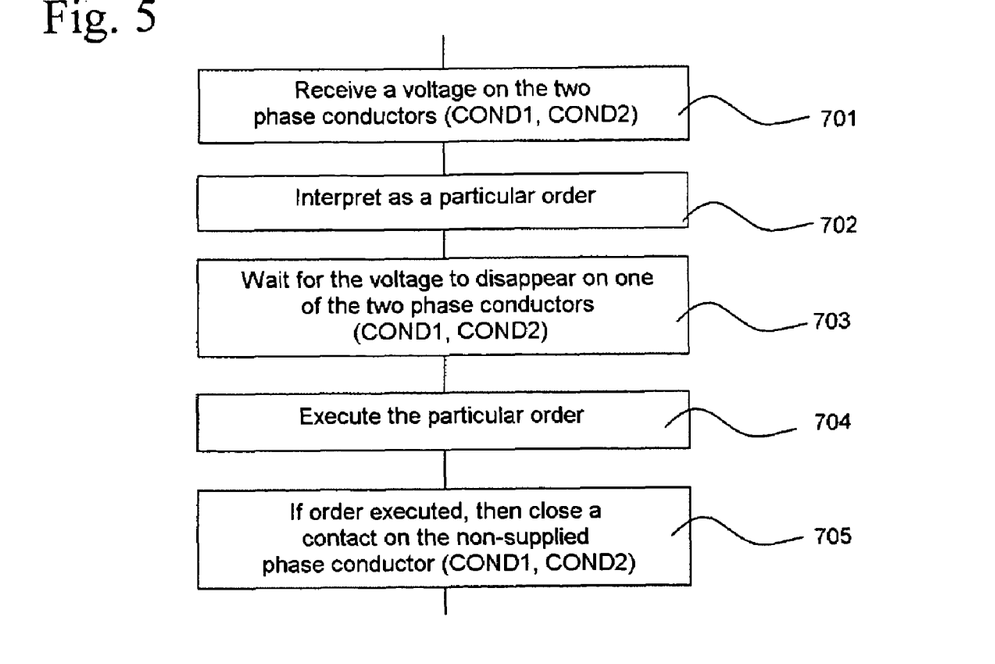
Figure 6:
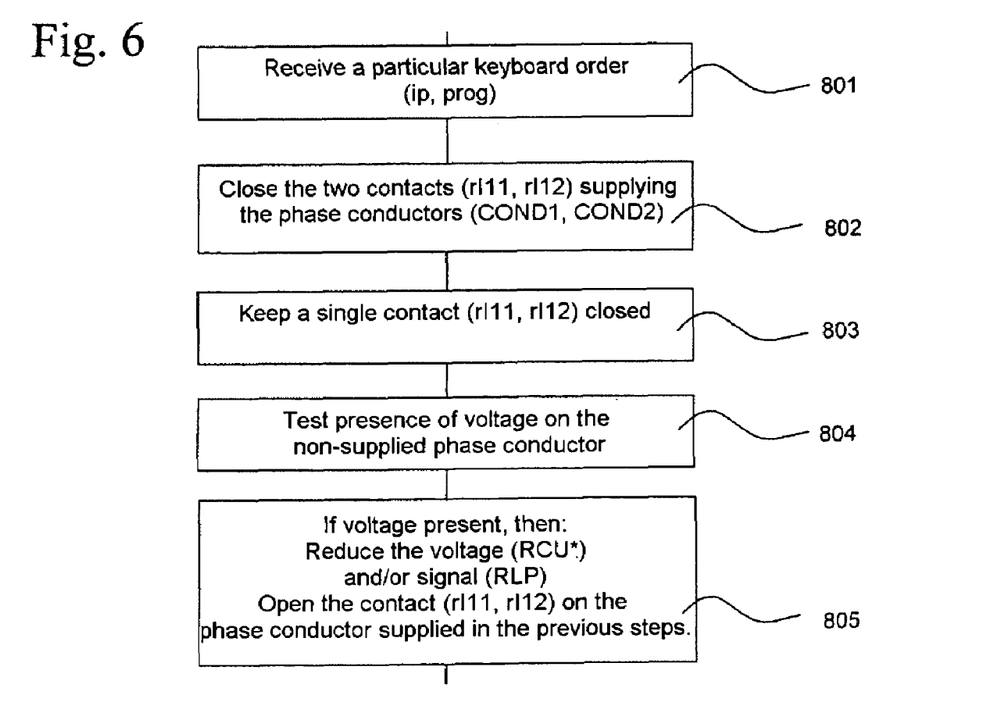

This second procedure is described with reference to FIGS. 5 and 6 relating to procedures for operating the actuator and the control unit. To control this displacement, the user presses, in a step 801, on the stop key SB of the keyboard KB of the control unit RCU, while no movement command is currently being executed. This press is interpreted by the logic processing unit CTL as a command to go to an intermediate position. This command is then communicated to the actuator in a step 802, where the two switches rI11 and rI12 are closed and the two conductors COND1 and COND2 are brought to the potential of the phase line for a predefined duration. In a step 701, this state of the conductors is detected by the logic processing unit CPU of the actuator which interprets, in a step 702, this as a command to displace the movable element to the intermediate position. Once the predefined duration has elapsed, in a step 803, one of the two switches rI11 and rI12 is opened (for example rI12) and one of the switches rI1 or rI2 is closed (for example rI1). As soon as the closure of one of the switches rI1 or rI2 and the opening of one of the two switches rI11 and rI12 is detected in a step 703, the motor is supplied in a step 704. The state of the inverter switch rI3 will have previously been controlled as a function of the current value of the counter CNT (image of the current position of the movable element) and of the value ip stored in memory (image of the predefined intermediate position) so that the activation of the motor causes the displacement of the movable element in the appropriate direction.

In a step 804, the potential of the phase conductors COND1 and COND2 is tested. As soon as the value contained in the counter CNT reaches the value ip stored in memory, the triac TRC goes to the off state and the motor is no longer supplied. In a step 705, the switch rI2 is closed. The switches rI1 and rI11 also being closed, the potential of the conductors COND1 and COND2 is brought to the potential of the phase of the supply voltage. The appearance of this potential on the conductor COND2 is detected, in a step 805, by the logic processing unit of the control unit RCU. This appearance signifies that a direct contact has been made between the conductors COND1 and COND2. As a consequence, the control unit RCU signals to the user that the movable element has reached its predefined intermediate position and that the command to take the movable element to an intermediate position has been correctly executed. This information signal may for example consist of the activation of an indicator light on the control unit RCU. The control unit may moreover control the execution of other procedures such as in particular a phase of supplying at reduced voltage.

In variant executions, the actuator can instruct a particular sequence of closing and opening of the controlled switches rI1 and rI2 to indicate that the movable element has reached the predefined intermediate position. As a consequence of this indication, the control unit RCU can instruct or otherwise the opening of the switches rI11 and rI12 as a function of the action that the user had exerted. If the action of the user corresponded to a command to displace the movable element to as far as the predefined intermediate position, the switches are opened and, if the action corresponded to a command to displace the movable element until it reaches an end-of-travel position, the states of the switches are maintained. The benefit of such a variant is that there is no need to transmit a particular command to go to the intermediate position, thereby dispensing with steps 802, 701, 702 and 703. It should be noted that, according to this method, the control unit RCU knows the relative situation of the movable product LD with respect to the predefined intermediate position, and is therefore in a position to determine whether it is necessary to close the controlled switch rI11 or the controlled switch rI12 so as to cause the movement going to this intermediate position.

In a variant execution, a stop order by pressing the key SB of the keyboard KB of the control unit RCU, while a movement command is currently being executed, causes in the control unit the closure of the as yet unactivated controlled inverter (for example rI11 if a down command is currently being executed and if rI12 is closed). When the logic processing unit CPU of the actuator detects that the two logic inputs I1 and I2 are in the high state, then a command to open the triac TRC is given on the output O4 of the logic processing unit, thereby causing the stoppage of the motor even though the actuator remains supplied. It is then possible to confirm the appropriate execution of the stoppage by an opening, or a combination of openings and closings, of one of the contacts rI1 or rI2.

It should be noted that this manner of operation is also possible in the case of two control units wired up in parallel, one having given the movement command while the action on the stop key is brought about on the other unit.

It is also possible, when the logic processing unit CPU of the actuator detects that the two logic inputs I1 and I2 are in the high state, to simply open the controlled contact (rI1 or rI2) which would bring about the supplying of the motor. In this case, there is no return of information on the appropriate execution of the stop command. The latter variant will be used in case of replacement of the controlled contact, such as the triac TRC, between the internal wire N1 and the neutral conductor AC-N, with a direct link.

According to another variant operating procedure, the actuator may be supplied at reduced voltage from the control unit RCU, following an item of information transmitted from the actuator to the control unit by a sequence for switching the switch rI1 or rI2. To do this, the control unit RCU must be equipped with a device with triac for reducing the voltage RVU* identical to the device RVU represented in FIG. 1. The setup of the voltage reduction device RVU* is represented dotted in the control unit in FIG. 1. Such a device is activated by a fourth output O14 of the logic processing unit CTL. In this way, phases of operation of the actuator at reduced torque may be engaged as soon as conditions are fulfilled at the actuator level. A control unit RCU exhibiting such a voltage reduction device is especially beneficial when the actuator has no voltage reduction device.

The control unit described has a keyboard, however, it may comprise in addition to or as replacement for this keyboard any type of detector known to the person skilled in the art such as for example a presence detector, a wind detector or a sunshine detector.

As seen previously, in certain cases, the controlled switches rI1, rI2, rI11 and rI12 must carry out several switchings in a short time interval. In these cases, the switches advantageously consist of semiconductor switches. When numerous switchings may be instructed in a restricted time interval, the sequences of switchings may code control unit and actuator identifiers and various items of information or orders.

The arrangement in which the switches rI1 and rI2 are embodied by virtue of thyristor-based arrangements turns out to be especially beneficial insofar as it makes it possible to implement procedures for transmitting information from the actuator to the control unit, in which procedures various data may be coded in a simple manner by acting on parameters for angular shifting of triggering of the on state of the thyristors.

We return to the example of a down command to lower the movable element seen previously. Following an action of the user on the control unit, the controlled switch rI12 is closed. The phase conductor COND2 is consequently brought to the potential of the phase of the supply voltage. The switch between the points N1 and N0 being open, the motor is not supplied. Likewise, the thyristors TH1 and TH2 being off, the conductor COND1 is not brought to the potential of the conductor COND2. Once the potential of COND1 has been detected and interpreted as a down command to lower the movable element, the thyristor TH2 is turned on. Thus, the positive half-waves of the supply voltage are communicated to the conductor COND1 through the thyristor TH2 and the diode D11. For example, throughout the duration of the motor supply phase, the gate signal emitted by the output O2 of the logic processing unit makes it possible to transmit almost the entirety of the positive half-waves with the exception of one half-wave out of ten, for which the on state of the thyristor TH2 is turned on with an angular shift of 30°. This small shift occurring from time to time may readily be detected by the control unit which investigates the potential of the conductor COND1 and allows correct supply to the motor.

In the case where an obstacle is detected while the movable element is not in the bottom position, the angular shift with regard to the triggering of the thyristor may be modified. It may for example be fixed at 90° and occur every three positive half-waves.

This shift is detected by the control unit which investigates the potential of the conductor COND1 and is interpreted as meaning that the movable element has encountered an obstacle. The control unit may thereafter emit an information signal for the attention of the user.

When the value reached by the counter CNT is identical to the value stored in memory and corresponding to the bottom position of the movable element, the thyristor TH1 may also be turned on. In this case all the half-waves of the supply voltage are transmitted to the conductor COND1. The potential of this conductor is detected by the control unit which interprets it as meaning that the movable element has arrived at the bottom position. The control unit can thereafter emit an information signal for the attention of the user.

By making use of the existence of the gate signals to control the on state of the thyristors TH1 and/or TH2, the angular shifts of these signals and the frequency of these shifts, it is possible to code a large number of items of information which may be transmitted from the actuator to the control unit.

When the controlled switches rI1 and rI2 are embodied as thyristor-based arrangements as described previously, these thyristors may be controlled in such a way as to supply the electric motor at reduced voltage, dispensing with part of the positive or negative half-waves of the supply voltage.

Thus, once a communication protocol and links for pairing between the control units and the actuators have been defined, the control units and the actuators can communicate selectively or otherwise with one another.

For example, the installation can comprise an actuator linked to several control units, connected in parallel.

When a control unit sends an up command to the actuator, and when this command is executed correctly, the actuator addresses the confirmation message simultaneously to all the control units. Thus, all the control units know the position of the movable product and can update their display or the like.

The direct contact made and/or broken between the two phase conductors COND1 and COND2 to transmit an item of information may therefore be brought about over very short intervals, and in particular time intervals of less than a half-period of the AC mains.

Finally the invention can be applied to an actuator comprising any type of motor, in particular a DC motor, provided that the direction of rotation is defined by the application of the mains voltage between the neutral conductor and either a first phase conductor, or a second phase conductor.

The invention claimed is:

1. A method of operation of an installation (INS) comprising:
    applying an AC electric voltage to at least one actuator (ACT) to drive a movable element (LD) equipping a building, in a first direction when the AC electric voltage is applied between a neutral conductor (AC-N) and a first phase conductor (COND1) and in a second direction when the AC electric voltage is applied between the neutral conductor and a second phase conductor (COND2);
    detecting an item of information at a level of the actuator;
    initiating, in response to the detection of the item of information, a sequence of one or more switching operations at the level of the actuator, said sequence including at least one switching making a direct contact between the first phase conductor and the second phase conductor or one switching breaking the direct contact between the first phase conductor and the second phase conductor.

2. The method of operation as claimed in claim 1, wherein the item of information is one event selected from the group consisting of entry of the installation (INS) into a programming mode, reaching of a particular position by the movable element, detection of an overload, reaching of a critical temperature by one of the components of the actuator (ACT), start of execution of a command, and end of execution of a command.

3. The method of operation as claimed in claim 1, wherein at least one control unit (RCU) is enabled to apply the AC electric voltage between the neutral conductor (AC-N) and the first phase conductor (COND1) or between the neutral conductor (AC-N) and the second phase conductor (COND2), investigate the occurrence of sequences of at least one switching making or breaking a direct contact between the first (COND1) and the second (COND2) phase conductor and implement a procedure specific to the switching sequence detected.

4. The method of operation as claimed in claim 3, wherein the specific procedure is at least one selected from the group consisting of signaling, cutting off of the AC voltage being applied to the first conductor or the second conductor, timeout of a predetermined time interval, and reduction of the voltage level of the AC voltage.

5. The method of claim 1, comprising transmitting information from the actuator to a control unit (RCU).

6. The method of claim 5, wherein a particular sequence of one or more switching operations indicates a respective state of the movable element.

7. The method of claim 6, wherein the respective state of the movable element is transmitted from the actuator to the control unit.

8. An actuator (ACT) supplied with an AC electric voltage to drive a movable element (LD) equipping a building in a first direction when the AC electric voltage is applied between a neutral conductor (AC-N) and a first phase conductor (COND1) and in a second direction when the AC electric voltage is applied between the neutral conductor (AC-N) and a second phase conductor (COND2), comprising:
    a monophase induction motor (MOT) with permanent capacitor (CM), the capacitor being linked to each non-common end of two windings (W1, W2) of the motor (MOT), these windings comprising a common end (P0), and at least one first controlled switch (rI1) and one second controlled switch (rI2),
    wherein the first controlled switch (rI1) is enabled to link the first phase conductor (COND1) to the common end (P0) of the windings (W1, W2) and
    wherein the second controlled switch (rI2) is enabled to link the second phase conductor (COND2) to the common end (P0) of the windings (W1, W2).

9. The actuator (ACT) as claimed in claim 8, further comprising a detecting device (TCU) configured to detect overload of forces measuring at least the voltage across terminals of the permanent capacitor (CM).

10. The actuator (ACT) as claimed in claim 8, further comprising control means (CPU) for closing the first controlled switch (rI1) and the second controlled switch (rI2) simultaneously.

11. The actuator (ACT) as claimed in claim 8, further comprising detecting means (RP1, RP2, CPU) for detecting the appearance of one and the same potential on the first phase conductor (COND1) and the second phase conductor (COND2), while one of the first or second controlled switches (rI1, rI2) is open although the other is closed and for causing the opening of the closed controlled switch.

12. The actuator (ACT) as claimed in claim 8, wherein a controlled inverting switch (rI3) is connected to each of the other two ends (P1, P2) of each winding and, via a terminal supporting the movable contact, to an internal wire (N1) connected to the neutral conductor (AC-N) by a third controlled switch (TRC).

13. The actuator (ACT) as claimed in claim 12, further comprising control means (CPU, RVU) for causing the opening of the third controlled switch (TRC) upon the appearance of one and the same potential on the first phase conductor (COND1) and the second phase conductor (COND2), while one of the first and second controlled switches (rI1, rI2) is open although the other is closed.

14. The actuator (ACT) as claimed in claim 8, wherein a controlled inverting switch (rI3) is connected to each of the other two ends (P1, P2) of each winding and, via a terminal supporting the movable contact, to an internal wire (N1) connected to the neutral conductor (AC-N) by a direct link.

15. A control unit (RCU) comprising:
    a first terminal linked to a first phase conductor (COND1) of an actuator (ACT), a second terminal linked to a second phase conductor (COND2) of the actuator (ACT), a third terminal linked to a phase of an AC electric voltage, a first switch (rI11) and a second switch (rI12) each disposed respectively on a first conductor linking the first terminal to the third terminal and on a second conductor linking the second terminal to the third terminal, and detecting means (CTL) for detecting a direct contact between the first terminal and the second terminal.

16. An installation (INS) comprising:

at least one actuator (ACT) supplied with an AC electric voltage, to drive a movable element (LD) equipping a building in a first direction when the AC electric voltage is applied between a neutral conductor (AC-N) and a first phase conductor (COND1) and in a second direction when the AC electric voltage is applied between the neutral conductor (AC-N) and a second phase conductor (COND2); and a monophase induction motor (MOT) with permanent capacitor (CM), the capacitor being linked to each non-common end of two windings (W1, W2) of the motor (MOT), these windings comprising a common end (P0), and at least one first controlled switch (rI1) and one second controlled switch (rI2), wherein the first controlled switch (rI1) enabled to link the first phase conductor (COND1) to the common end (P0) of the windings (W1, W2) and wherein the second controlled switch (rI2) is enabled to link the second phase conductor (COND2) to the common end (P0) of the windings (W1, W2) and at least one control unit (RCU) comprising:

a first terminal linked to the first phase conductor (COND1) of the at least one actuator (ACT), a second terminal linked to the second phase conductor (COND2) of the at least one actuator (ACT), a third terminal linked to a phase of the AC electric voltage, a first switch (rI11) and a second switch (rI12) each disposed respectively on a first conductor linking the first terminal to the third terminal and on a second conductor linking the second terminal to the third terminal, and detecting means (CTL) for detecting a direct contact between the first terminal and the second terminal.

* * * * *